United States Patent
Karmarkar et al.

(10) Patent No.: US 7,809,691 B1
(45) Date of Patent: Oct. 5, 2010

(54) SYSTEM AND METHOD OF APPLYING INCREMENTAL CHANGES PRIOR TO INITIALIZATION OF A POINT-IN-TIME COPY

(75) Inventors: Kedar M. Karmarkar, Sunnyvale, CA (US); Deepak Tawri, Pune (IN); Raghu Krishnamurthy, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1048 days.

(21) Appl. No.: 11/063,133

(22) Filed: Feb. 22, 2005

(51) Int. Cl.
*G06F 17/30* (2006.01)
*G06F 12/00* (2006.01)

(52) U.S. Cl. .................. 707/674; 707/681; 707/685

(58) Field of Classification Search .................. 707/200, 707/202, 203, 204
See application file for complete search history.

(56) References Cited

U.S. PATENT DOCUMENTS

| | | | |
|---|---|---|---|
| 5,720,026 A * | 2/1998 | Uemura et al. ........... 714/6 |
| 6,023,710 A * | 2/2000 | Steiner et al. ........... 707/204 |
| 6,549,921 B1 * | 4/2003 | Ofek ................... 707/204 |
| 6,785,789 B1 | 8/2004 | Kekre et al. ........... 711/162 |
| 7,194,487 B1 * | 3/2007 | Kekre et al. ........... 707/201 |
| 7,284,104 B1 * | 10/2007 | Wu et al. .............. 711/162 |
| 7,310,654 B2 * | 12/2007 | McNeil ................ 707/204 |
| 2002/0143798 A1 | 10/2002 | Lisiecki et al. ......... 707/200 |
| 2003/0033308 A1 | 2/2003 | Patel et al. ........... 707/10 |
| 2005/0055523 A1 | 3/2005 | Suishu et al. .......... 711/165 |

* cited by examiner

*Primary Examiner*—Baoquoc N To
(74) *Attorney, Agent, or Firm*—Campbell Stephenson LLP

(57) ABSTRACT

Various systems and methods are disclosed for applying incremental changes prior to initialization of a point-in-time copy. For example, one method involves identifying an incremental change to information stored on a primary device. The incremental change is identified subsequent to a first point in time. The incremental change is applied to a first target device, prior to completing initialization of a second target device. The initialization of the second target device initializes the second target device as a point-in-time copy of the primary device. The point-in-time copy of the primary device is a copy of the primary device at the first point in time.

20 Claims, 9 Drawing Sheets

SYSTEM AND METHOD OF APPLYING INCREMENTAL CHANGES PRIOR TO INITIALIZATION OF A POINT-IN-TIME COPY

FIELD OF THE INVENTION

This invention relates to data processing systems and, more particularly, to replicating and backing up information in a data processing system.

BACKGROUND

Various information protection techniques are used to improve the availability of information. For example, backup techniques are used to provide redundant copies of information. If the original copy of the information is lost, due to equipment failure or human error, the information can be restored from a backup copy made at an earlier point in time. Backup techniques include full backups, which create a point-in-time image of a set of information on a backup device, and incremental backups, which copy the portions of the set of information that are modified during a particular time period to a backup device.

Replication is another information protection technique that is used to maintain copies of information at separate locations. For example, information can be replicated on several different sites within a corporation's campus and/or on several different ones of the corporation's campuses. If the information is replicated at different sites, and if the failure of the systems storing the information at one site is unlikely to cause the failure of the corresponding systems at another site, replication can provide increased information reliability. Thus, if a disaster occurs at one site, an application that uses that information can be restarted using a replicated copy of the information at another site.

Many information protection techniques, such as backup and replication, involve making point-in-time copies of the information stored on a primary storage device and then tracking incremental changes to that information. For example, a typical backup technique involves taking a full backup of the primary storage device and then, after the full backup has completed, taking one or more incremental backups. As noted above, the full backup is a complete copy of all of the information stored on the primary storage device at a particular point in time. In contrast, the incremental backups are copies of only the portions of the information that have been modified during a particular range of time. Completion of the full backup can take a significant amount of time (e.g., several hours). If the first incremental backup represents all changes that occur since the point in time represented by the full backup, and if the information in the first incremental backup cannot be copied to a backup device until the full backup has completed, a significant amount of resources may be required to temporarily buffer the information that will ultimately be copied to a backup device when the incremental backup is taken.

Like backup techniques, replication techniques often depend on having both point-in-time copies of and records of incremental changes to information stored by the primary storage device. For example, replication typically involves initializing a storage device at a remote site by restoring that storage device from a full backup of the primary storage device. After the storage device at the remote site has been initialized as a point-in-time copy of the primary storage device, incremental changes that have occurred at the primary storage device during the initialization of the remote site are replicated to the remote site. The primary site requires resources to temporarily buffer the incremental changes while the storage device at the remote site is being initialized.

As the above examples show, in typical situations, replication or backup activity that is based on incremental changes is delayed until the activity involving a full point-in-time copy (e.g., a full backup) has completed. For example, in replication, replication activity is delayed until the backup of the primary site and the restore at the remote site have both completed. This introduces both delay and expense into a data protection solution. For example, a typical replication scenario involves taking a full backup of the primary storage device, shipping the backup to the secondary site, and restoring the replica from the backup. This process can take several days, and it must be completed before any of the incremental changes to information stored on the primary storage device are applied to the replica. As a result, there needs to be a mechanism at the primary site to track all of the changes that occur to the information on the primary storage device subsequent to the point in time captured by the full backup.

Traditionally, a primary replication site is configured to store incremental changes, which need to be replicated to the secondary site, that occur over a several hours (e.g., 24 hours) in order to provide protection against situations in which the link between the primary and secondary site goes down. The amount of storage needed to be able to store the incremental changes at the primary site can be determined based on the time span (e.g., 24 hours) and expected storage access patterns. The backup and restore process involved in initialization may require significantly more than that time span, however, due to the time needed to ship the backup copy to the secondary site. As a result, the primary site needs to be configured with enough storage to store more than the normal amount of incremental changes during the initialization process. Thus, additional storage is required on primary site during initialization. Additionally, the recorded incremental changes are not transferred to the secondary site via the network until the backup and restore process has completed. Since there will be a larger amount of data to be transferred at the end of the backup and restore process than during a normal replication period, higher network bandwidth is required during the initialization process than during normal operation.

As the above examples show, existing data protection techniques have the potential to incur undesirable delay and/or expense. Accordingly, new techniques are desired for handling full backups and incremental changes when performing data protection techniques such as backup and replication.

SUMMARY

Various embodiments of systems and methods are disclosed for applying incremental changes prior to initialization of a point-in-time copy. In some embodiments, a method involves identifying an incremental change to information stored on a primary device. The incremental change is identified subsequent to a first point in time. The incremental change is applied to a first target device, prior to completing initialization of a second target device. The initialization of the second target device initializes the second target device as a point-in-time copy of the primary device. The point-in-time copy of the primary device is a copy of the primary device at the first point in time.

In one embodiment, the incremental changes are applied to the first target device by replicating the incremental changes to the first target device, which is a replica device. In such an embodiment, the second target device is initialized by restoring the second target device from a full backup of the primary device. The second target device can be the replica device, or a snapshot or other point-in-time copy of the replica device. If the second target device is the replica device, restoring the second target device from the full backup involves identifying whether a unit of data stored by the replica device has been modified by applying the incremental changes to the replica device. If the unit of data has not been modified, a value of the unit of data is copied from the full backup of the primary device to the replica device.

In another embodiment, a method also involves initializing the second target device by, at least in part, performing a full backup of the primary device to the second target device. In this embodiment, the first target device stores an incremental backup of the primary device, while the second target device stores a full backup of the primary device. Performing the full backup initializes the second target device as the point-in-time copy of the primary device.

In another embodiment, the primary device is both the first and second target device. Applying the incremental changes to the first target device restores the primary device from an incremental backup of the primary device. Restoring the primary device from a full backup of the primary device initializes the second target device as the point-in-time copy of the primary device.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
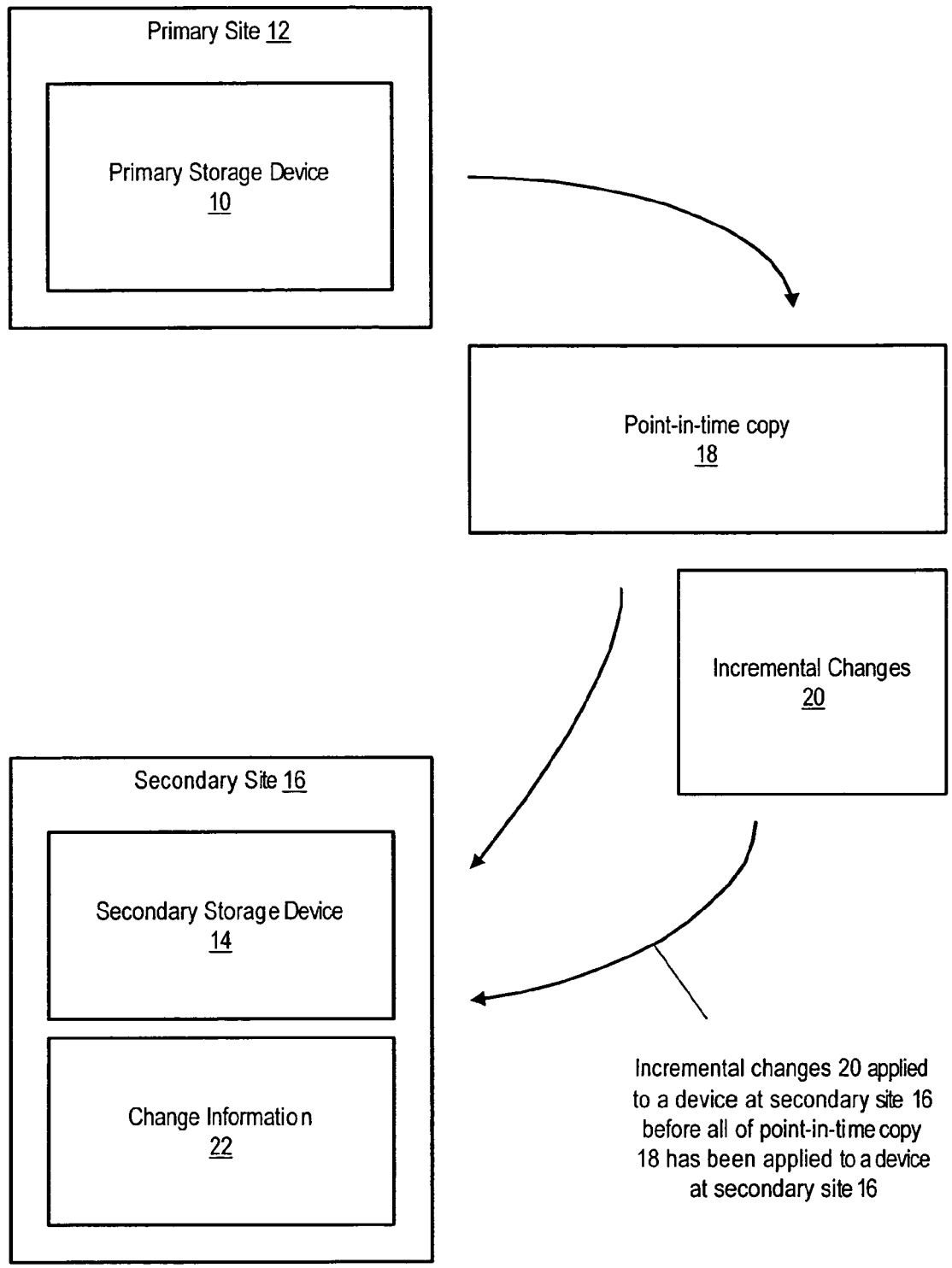
FIG. 1 shows a scenario for initializing a replica by applying incremental changes to the replica before the replica has been initialized as a point-in-time copy of the primary, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 2:
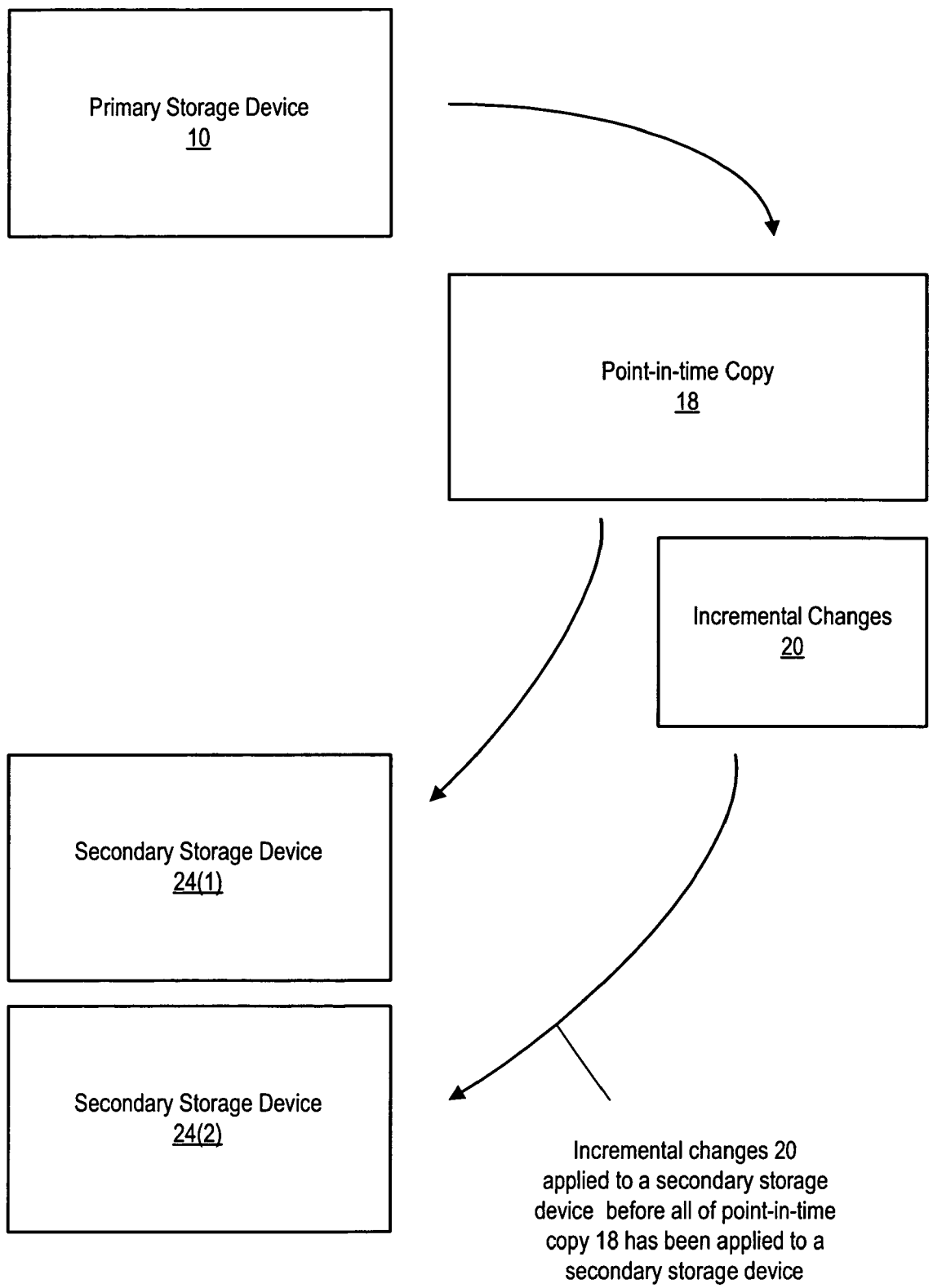
FIG. 2 illustrates a scenario for performing backups, in which incremental changes are saved in an incremental backup prior to completion of a full backup, according to one embodiment of the present invention.
Figure 3:
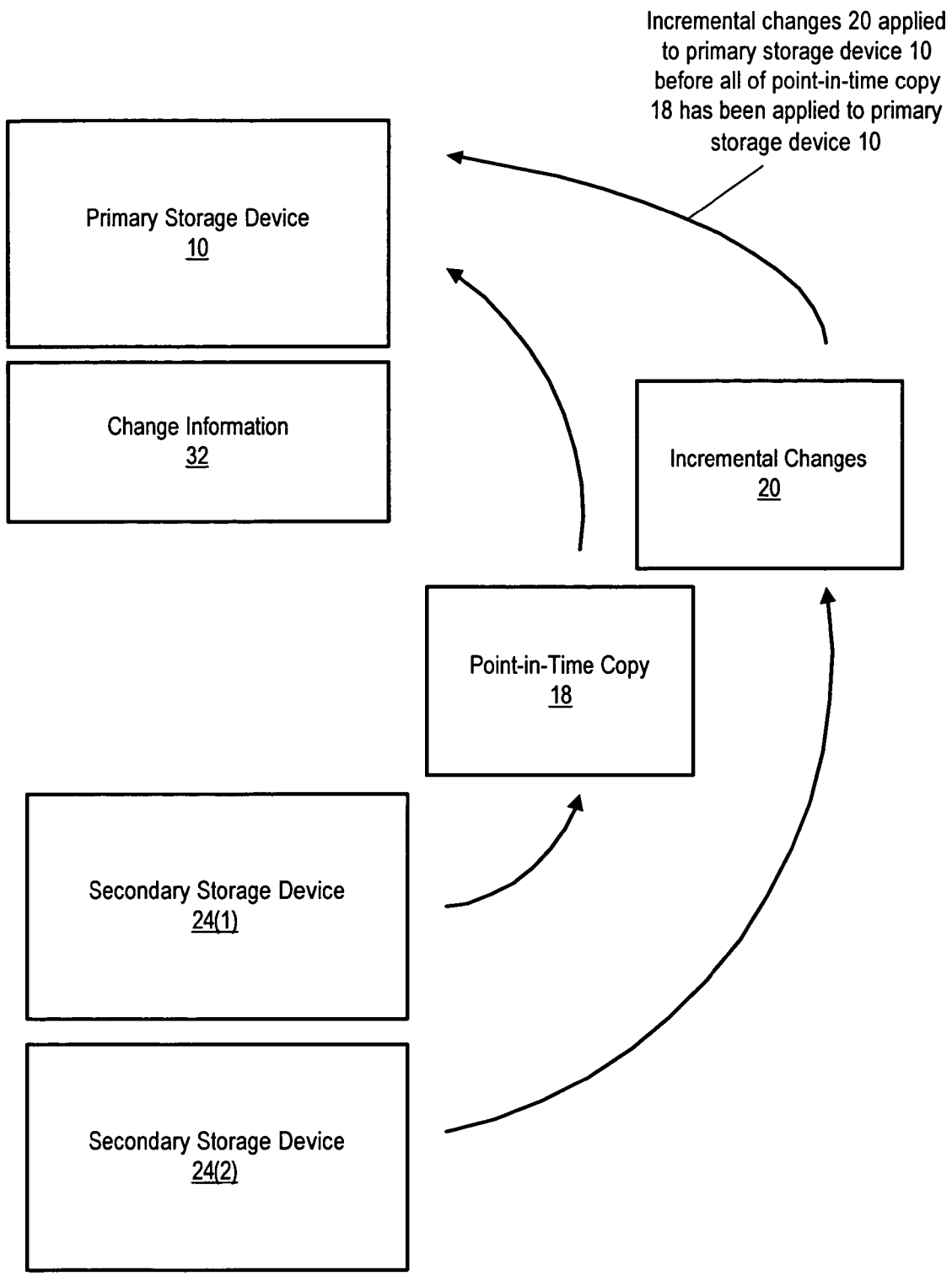
FIG. 3 shows a scenario for restoring the primary storage device from backups, in which the primary storage device is restored from an incremental backup prior to being restored from a full backup, according to one embodiment of the present invention.

Various techniques are disclosed for identifying incremental changes to a primary storage device and then transferring the incremental changes to a backup or replica device before any backup or replica device has been initialized as a point-in-time copy of the primary storage device. For example, incremental changes to a primary storage device can be transferred to a secondary site for replication, before a replica device at the secondary site has been restored from a backup of the primary storage device. Similarly, incremental changes to a primary storage device can be written to a backup storage device before a point-in-time copy of the primary storage device has been completely written to a backup storage device. FIGS. 1-3 provide examples of situations in which such techniques can be used. It is noted that data protection activities such as replication and backups can be performed at the volume level (e.g., by copying blocks or extents), the file level (e.g., by copying files or portions of files), the application level, or the disk level.

FIG. 1 shows a scenario for synchronizing a replica with a primary storage device by applying incremental changes to the replica before the replica has been initialized as a point-in-time copy of the primary. In this example, information stored on primary storage device 10, located at a primary site 12, is being replicated to secondary storage device 14, which is located at a secondary site 16. The information being replicated can include application data, metadata, logs, and the like. Replication can be performed at the volume level by copying blocks or extents of information or at the file level by copying files or portions of files (e.g., file blocks). Extents are groups of one or more contiguous blocks of information.

In order to perform replication, secondary storage device 14 needs to be synchronized with primary storage device 10, such that the information stored by secondary storage device 14 is consistent with the information stored by primary storage device 10. Historically, synchronization has involved initializing a secondary storage device as a point-in-time copy of the primary storage device (typically by restoring the secondary storage device from a full backup of the primary storage device). While the full backup is being created, transferred to the secondary site, and then applied to the secondary storage device, changes to information on the primary storage device are tracked (typically by storing the new values on the changed portions of the information in a log). After the secondary storage device has been restored from the full backup, these changes are transferred to the secondary site (typically via a network) and applied to the secondary storage device. Thus, historically, the incremental changes that occur after the point-in-time at which the backup is created are not applied to the secondary storage device until after the secondary storage device has been initialized as a point-in-time copy of the primary storage device.

In contrast, FIG. 1 shows a scenario in which incremental changes are applied to secondary storage device 14 before secondary storage device 14 has been completely initialized as a point-in-time copy of primary storage device 10. This can reduce the storage requirements at primary site 12, since primary site 12 will not need to keep track of incremental changes for as long as primary site 12 would if incremental changes were not transferred until after secondary storage device 14 was initialized as a point-in-time copy of primary storage device 10.

As shown, a point-in-time copy 18 of the information stored on primary storage device 10 has been created. Point-in-time copy 18 is a copy of the information that was stored on primary storage device 10 at time T0. Point-in-time copy 18 can be created by taking a full backup of primary storage device 10. In one embodiment, performance of the full backup involves preventing user access to primary storage device 10 from T0 until all of the information stored on primary storage device 10 has been copied to a backup device. In another embodiment, a snapshot or other frozen image of primary storage device 10 is created at time T0. The full backup is then performed by copying all of the information stored in the frozen image to a backup device. In yet another embodiment, point-in-time copy 18 can be created by operating a mirror of primary storage device 10, and then detaching the mirror from primary storage device 10 at the point-in-time at which the copy is desired.

As shown by the arrows in FIG. 1, point-in-time copy 18 is transferred from primary site 12 to secondary site. Point-in-time copy 18 can be transferred via a network; however, the amount of data to be transferred may make it more cost effective to instead transport the physical storage media that stores the point-in-time copy from primary site 12 to secondary site 16. For example, point-in-time copy 18 can be transferred by using a postal or courier service to ship a hard disk or tape that stores point-in-time copy 18 from primary site 12 to secondary site 16.

In addition to point-in-time copy 18, a set of one or more incremental changes 20 to primary storage device 10 is also transferred to secondary site 16. Incremental changes 20 include a copy of each portion of the information stored in primary storage device 10 that has been modified subsequent to T0. These changes can occur while point-in-time copy 18 is being created, as well as while point-in-time copy 18 is being transferred to secondary site 16 and then applied to secondary storage device 14.

Incremental changes 20 are transferred to secondary site 16 via a network (not shown) that couples primary site 12 and secondary site 16. The incremental changes can be sent to the secondary site on an transaction-by-transaction basis (e.g., if synchronous replication is being performed), such that each time a transaction modifies information on primary storage device 10, the changes caused by that transaction will be sent to secondary site 16 for application to secondary storage device 14. Alternatively, the changes can be sent to secondary site 16 on a periodic basis (e.g., if periodic replication is being performed). In such a situation, a log or other means for tracking changes can be implemented at primary site 12. During a given replication period, any changes to the information stored on primary storage device 10 will be recorded in the log. At the end of each replication period, the changes that occurred during the replication period are transferred to the secondary site and applied to the secondary storage device.

Change information 22 identifies the information stored on secondary storage device 14 that has been modified as a result of applying incremental changes 20 to secondary storage device 14. Change information 22 is stored in a log, bitmap, or other tracking mechanism that is used to keep track of which information stored on secondary storage device 14 is modified when incremental changes 20 are applied to secondary storage device. For example, if replication is being performed at the file level, a log can be used to track which files have been updated based on incremental changes 20.

Since incremental changes 20 are applied to secondary storage device 14 before point-in-time copy 18 has been fully applied to secondary storage device 14, some of the information already stored in secondary storage device 14 may be more recent than information being copied from point-in-time copy 18. As a result, before copying a particular item of information from point-in-time copy 18, a replication controller at secondary site 16 consults change information 22 to determine whether a more recent version of that item of information is already stored on secondary storage device 14. If a more recent version already exists, that item of information is not copied to secondary storage device 14 from point-in-time copy 18. If there is not a more recent version, that item of information will be copied to secondary storage device 14 from point-in-time copy 18. Once all of the information in point-in-time copy 18 for which there is not already a more recent version has been applied to secondary storage device 14, change information 22 can be discarded.

It is noted that information included in point-in-time copy 18 can be copied to secondary storage device 14 in parallel with information included in incremental changes 20. Additionally, incremental changes 20 can be copied to secondary storage device 14 before any of point-in-time copy 18 has been copied to secondary storage device 14.

While the example of FIG. 1 illustrates a situation in which point-in-time copy 18 and incremental changes 20 are applied directly to secondary storage device 14, it is noted that other embodiments are possible. For example, instead of being applied directly to secondary storage device 14, incremental changes 20 can be applied to a snapshot of secondary storage device 14. As another alternative, incremental changes 20 can be stored in a log or other tracking mechanism that is maintained at secondary site 18. In either situation, after point-in-time copy 18 has been copied to secondary storage device 14, the data in the snapshot or log can be applied to secondary storage device 14 (e.g., by restoring secondary storage device 14 from the snapshot or by replaying the log).

In each of the above-described situations, the incremental changes can be transferred to the secondary site and applied to a storage device (e.g., a log, a snapshot, or secondary storage device 14) before all of point-in-time copy 18 has been copied to secondary storage device 14. Thus, incremental changes 20 can begin to transferred to the secondary site and applied to a storage device (e.g., secondary storage device 14, a log, or a snapshot of secondary storage device 14) before any storage device (e.g., secondary storage device 14) at the secondary site has been initialized as a point-in-time copy of primary storage device 10.

FIG. 2 illustrates a scenario for performing backups, in which incremental changes are saved to an incremental backup prior to completion of a full backup. Here, backups of a primary storage device 10 are being performed. A full backup is performed in order to store a point-in-time copy of primary storage device 10 to a backup device. One or more incremental backups are also performed. The incremental backups are used to backup information stored by primary storage device 10 that has been modified subsequent to the point in time captured by the full backup.

As in FIG. 1, FIG. 2 shows how a point-in-time copy 18 of primary storage device 10 and incremental changes 20 to primary storage device 20 can be applied to secondary storage devices. In this example, two secondary storage devices 24(1) and 24(2) are used to store backups of information stored in primary storage device 10. Secondary storage device 24(1) stores a full backup of the information stored in primary storage device 10. Secondary storage device 24(2) stores an incremental backup of the information in primary storage device 10.

Similarly to the replication scenario depicted in FIG. 1, FIG. 2 involves a scenario in which incremental changes are applied to a secondary storage device before a secondary storage device has been initialized as a point-in-time copy of the primary storage device. Unlike the scenario in FIG. 1, in which both the full point-in-time copy and the incremental changes were applied to the same secondary storage device, the scenario in FIG. 2 depicts a scenario in which the incremental changes are applied to a different secondary storage device than the point-in-time copy.

Accordingly, at T0, a point-in-time copy 18 of the information in primary storage device 10 is generated (e.g., by creating a snapshot of primary storage device). A full backup of the information in primary storage device 10 is then created by writing the information in point-in-time copy 18 to secondary storage device 24(1).

Incremental changes 20 (e.g., changes that occur due to the modification or deletion of existing information or the creation of new information) that occur subsequent to T0 and that affect the information stored on primary storage device 10 are applied to secondary storage device 24(2). Applying incremental changes 20 to secondary storage device 24(2) involves copying modified extents or files from primary storage device 10 (or from a point-in-time copy of primary storage device 10) to secondary storage device 24(2). Accordingly, an incremental backup of the information stored on primary storage device 10 is stored on secondary storage device 24(2). Incremental changes 20 are copied to secondary storage device 24(2) before all (or perhaps any) of point-in-time copy 18 has been written to secondary storage device 24(1).

The incremental backup stored on secondary storage device 24(2) can include information identifying which portions of the information stored on primary storage device 10 were modified during the backup period for which the incremental backup was generated. In some embodiments, this information can be used to limit the amount of information that is copied to the full backup. For example, if a file-based backup is performed, and if the incremental backup already stores the most recent version of a particular file, that backup system can decide to not copy the older version of that file to the full backup. Accordingly, the amount of data movement needed to perform the backup can be reduced. However, it is noted that this technique should only be used in situations in which it is only desirable to have a backup that can be used to restore the most recent version of the information stored on primary storage device 10, since use of this technique may result in there not being enough information captured in the backups to be able to restore to earlier versions of the information.

FIG. 3 shows a scenario for restoring a primary storage device from backups, in which the primary storage device is restored from an incremental backup prior to being restored from a full backup. FIG. 3 includes the same storage devices as FIG. 2. In FIG. 2, information was copied from primary storage device 10 to secondary storage devices 24(1) and 24(2). In contrast, FIG. 3 shows a scenario in which information is being copied from secondary storage devices 24(1) and 24(2) to primary storage device 10 (as indicated by the arrows).

Historically, restoring information from a full backup and one or more incremental backups involved first restoring the information from the full backup and then restoring the information from each of the incremental backups, starting with the oldest (least recently created) incremental backup and ending with the newest (most recently created) incremental backup. FIG. 3 illustrates a different scenario, in which information in an incremental backup, stored on secondary storage device, is applied to the device that is being restored before the device has been fully restored from the full backup. Furthermore, if there are multiple incremental backups (not shown), the device is restored by applying incremental backups in reverse chronological order, such that the most recently created incremental backups are applied to the target device before the least recently created incremental backups.

In FIG. 3, the information stored on primary storage device 10 is being restored from backup. Both a full backup and an incremental backup of the information stored on primary storage device 10 are available. The full backup stores a point-in-time copy 18 of all the information stored on primary storage device 10 at T0, and is stored on secondary storage device 24(1). The incremental backup stores a copy of the portions of the information that were modified subsequent to T0 and prior to T1, and is stored on secondary storage device 24(2). It is noted that additional incremental backups may also be available (e.g., the incremental backup stored on storage device 24(2) can store a copy of information that was modified between T0 and T1, while other incremental backups can store copies of information that was modified between T1 and T2, between T2 and T3, and so on).

As indicated by the arrows, the incremental changes 20 stored in the incremental backup are applied to primary storage device 10 before all of point-in-time copy 18 has been applied to primary storage device 10. More particularly, incremental changes 20 can be copied from the incremental backup to primary storage device 10 before any of point-in-time copy 18 has been copied to primary storage device 10. Alternatively, incremental changes 20 and point-in-time copy 18 can be applied to primary storage device 10 in parallel.

In order to avoid overwriting information that is copied from incremental changes 20 with information from point-in-time copy 18, change information 32 is maintained. Change information 32 identifies the portions of the information stored by primary storage device 10 that have been modified by applying incremental changes 20. Before writing a unit of data (e.g., a file or an extent) from point-in-time copy 18 to primary storage device 10, change information 32 is accessed to determine whether that unit of data has already been updated based on incremental changes 20. If so, that unit of data is not copied from point-in-time copy 18, since a more recent version (the version copied from incremental changes 20) of that unit of data is already stored on primary storage device 20.

FIG. 3 shows a situation in which a single incremental backup is available for use in the restore process. It is noted that in many situations, a primary storage device can be restored from a combination of a full backup and multiple incremental backups. In those situations, the incremental backups are copied to the primary storage device in reverse order, such that the most recent incremental backup is copied to the primary storage device first. When data is copied from the other incremental backups, change information 32 is consulted, as described above, in order to avoid overwriting information with an older version.

Figure 4:
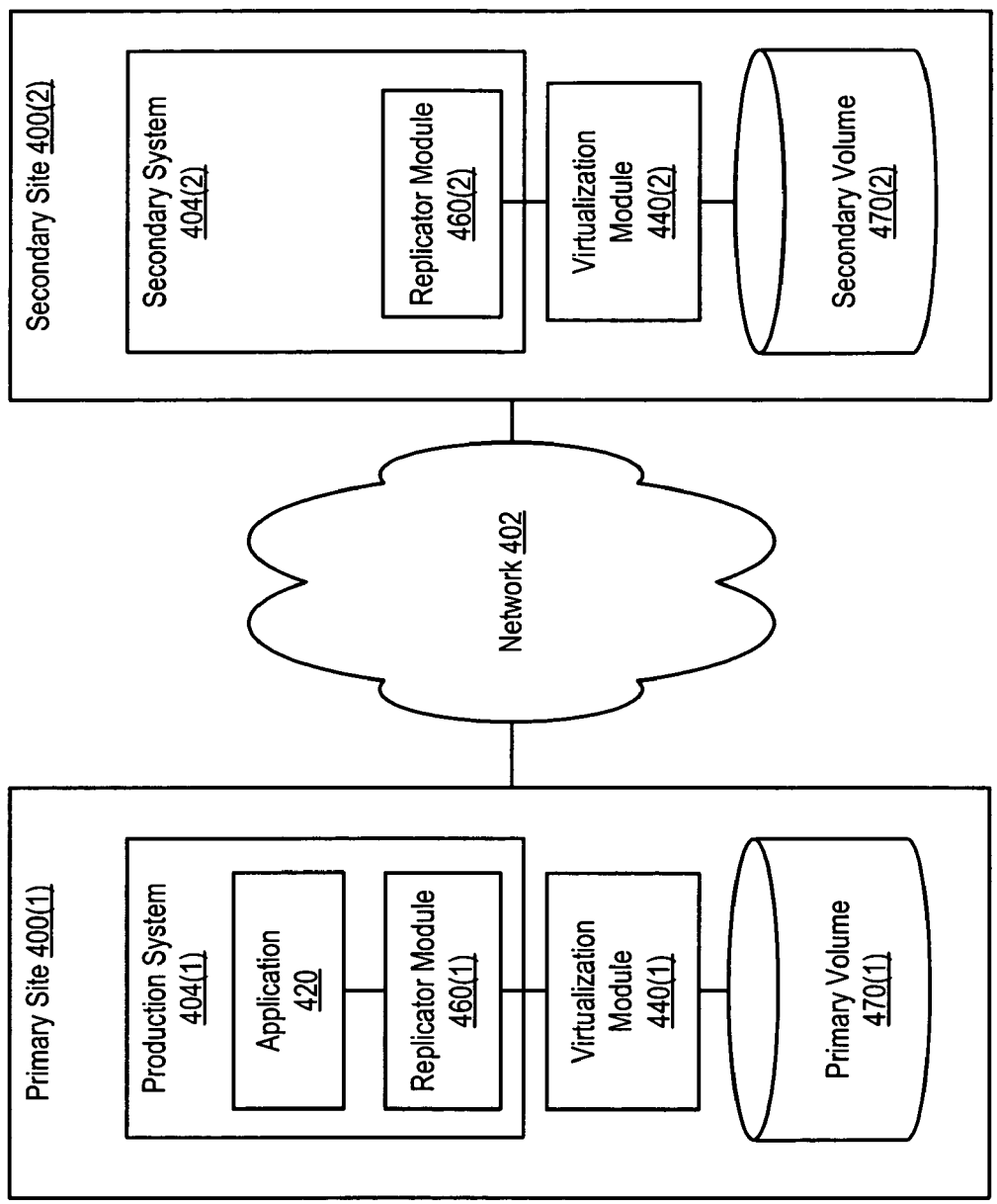
FIG. 4 is a block diagram of a system for performing replication, according to one embodiment of the present invention.

FIG. 4 is a block diagram of a system for performing replication from a primary volume to a secondary volume. The system illustrated in FIG. 4 can be used to perform replication using techniques like those illustrated in FIG. 1.

This system includes a primary site 400(1) and a secondary site 400(2). Collectively, sites 400(1) and 400(2) are referred to as sites 400. Primary site 400(1) and secondary site 400(2) are coupled by a network 402. Network 402 can include a WAN (Wide Area Network), such as the Internet, one or more LANs (Local Area Networks), and/or one or more SANs (Storage Area Networks).

Primary site 400(1) includes a production system 404(1), which implements the functionality of an application 420 and a replication module 460(1). Primary site 400(1) also includes a virtualization module 440(1) and a primary volume 470(1). In some embodiments, virtualization module 440(1) is implemented in hardware and/or software on a network switch, network appliance, or storage device controller (e.g., an array controller). In alternative embodiments, virtualization module 440(1) is implemented in software that executes on production system 404(1). While FIG. 4 shows a situation in which replication module 460(1) is implemented in software that executes on production system 404(1), it is noted that replication module 460(1) can alternatively be implemented in hardware and/or software on a host, network switch, network appliance, or storage device controller (e.g., an array controller). Additionally, in one embodiment, replicator module 460(1) is implemented as part of a backup component such as VERITAS NetBackup™, available from VERITAS Software Corp., of Mountain View, Calif.

While FIG. 4 illustrates a situation in which there is a single production system with respect to data in primary volume 470(1), it is noted that in alternative embodiments, multiple production systems can be present. For example, a distributed file system (such as the cluster file system (CFS) provided by VERITAS Storage Foundation™, available from VERITAS Software Corp., of Mountain View, Calif.) can be executed on each of several different nodes within a cluster, allowing each node to act as a production system.

Secondary site 400(2) includes secondary system 404(2), which implements the functionality of replicator module 460(2), as well as virtualization module 440(2) and a secondary volume 470(2). Like virtualization module 440(1), virtualization module 440(2) and/or replicator module 460(2) can be implemented in hardware and/or software on secondary system 404(2) or on another device (e.g., a network switch, appliance, or storage device controller).

A file system (not shown) can provide the interface via which users, such as application 420, access files on primary volume 470(1). Accordingly, the production system controls access to files on primary volume 470(1). It is noted that the production system could implement other mechanisms (e.g., databases, object-based storage, or the like) for abstracting data objects on volume 470(1) instead of and/or in addition to a file system. In general, the production system includes functionality that provides an abstraction of data to user applications and that maps abstract data objects such as files to locations on a storage device (e.g., primary volume 470(1)).

Each system 404(1) and 404(2) (collectively, systems 404) can include one or more computing devices configured to execute software implementing various applications (e.g., application 420, virtualization module 440(1) or 440(2), and/or replicator module 460(1) or 460(2)). In such embodiments, each system 404 can include a workstation, personal computer, server, PDA (Personal Digital Assistant), cell phone, storage network switch, storage device, storage array controller, or any other device configured to execute software implementing such applications. Alternatively, each system 404 can be implemented from one or more logic devices (e.g., PLDs, FPGAs, and the like) configured to perform the functions of such applications. Systems 404 can also be implemented using logic devices that are configured to perform some of the functions of the applications and that are also configured to execute software implementing other functions of the applications.

Application 420 is an example of an application that accesses files on primary volume 170(1). Application 420 can be any one of a variety of applications, such as a database application, a word processing application, and the like. It is noted that in some embodiments, application 420 is distributed in nature (e.g., like Oracle Parallel Server™ or Oracle RAC™). Such applications can access the same data (or files) from different production systems.

Virtualization modules 440(1) and 440(2) (collectively, virtualization modules 440) each create and manage one or more logical storage devices such as primary volume 470(1) and secondary volume 470(2). Each virtualization module 440 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Replicator modules 460(1) and 460(2) at the primary and secondary sites cooperate to maintain a replica (i.e., a consistent copy) of information stored on primary volume 470(1) on secondary volume 170(2). Consistency ensures that, even if the secondary volume is not identical to the first volume (e.g., updates to the secondary volume may lag behind updates to the primary volume), the secondary volume always represents a state of the primary volume that actually existed (or could have existed without violating any write-ordering rules) at a previous point in time. For example, if an application performs a sequence of writes A, B, and C to the primary volume, consistency can be maintained by performing these writes to the secondary volume in the same sequence. At no point should the secondary volume reflect a state that never actually occurred on the primary volume, such as the state that would have occurred if write C was performed before write B.

Each data volume 470(1) and 470(2) can be implemented on one or more physical storage devices. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device. It is noted that although a logical storage volume is shown in the illustrated example, other embodiments can use similar techniques to replicate data objects (such as files) that are stored directly on a physical storage device.

In the system of FIG. 4, replicator modules 460(1) and 460(2) can handle initialization of secondary volume 470(2) for use as a replica of primary volume 470(1). Backup modules (not shown) at primary site 400(1) and 400(2) can be used to respectively create a point-in-time copy of information stored in primary volume 470(1) and to restore secondary volume 470(2) from that point-in-time copy. In one embodiment, these backup modules are integrated with the replica modules. While the backup processes generate the backup of primary volume 470(1) and restore secondary volume 470(2) from that backup, replicator module 460(1) sends incremental changes to replicator module 460(2) via network 402. The incremental changes occur due to applications such as application 420 modifying, creating, and/or deleting information on primary volume 470(1) subsequent to the point in time at which the backup is taken. Replicator module 460(2) identifies (e.g., in a bitmap or log) which portions of secondary volume 470(2) store information that has been modified by the replicated incremental changes. When secondary volume 470(2) is restored from the backup, the identified portions of secondary volume 470(2) are not overwritten by the restore process.

While FIG. 4 illustrates a system configured to replicate files on a single data volume, other embodiments support replication of files from multiple data volumes. In such embodiments, the group of data volumes at the primary site 400(1) can be included in a primary replication volume group. Files on this primary replication volume group are then replicated to one or more volumes at the secondary site 400(2).

In some embodiments, there are multiple secondary volumes 470(2) (or replication volume groups) to which replicator module 460 replicates files in primary volume 470(1) (or a primary replication volume group). Identical replication operations are typically performed to all secondary volumes.

The example of FIG. 4 shows replicator modules 460(1) and 460(2) and virtualization modules 470(1) and 470(2) as independent modules. It is noted that in alternative embodiments, the functionality of these modules can be combined and/or implemented in other ways. For example, replicator module 160(1) and virtualization module 470(1) can be combined into a single module.

Figure 5:
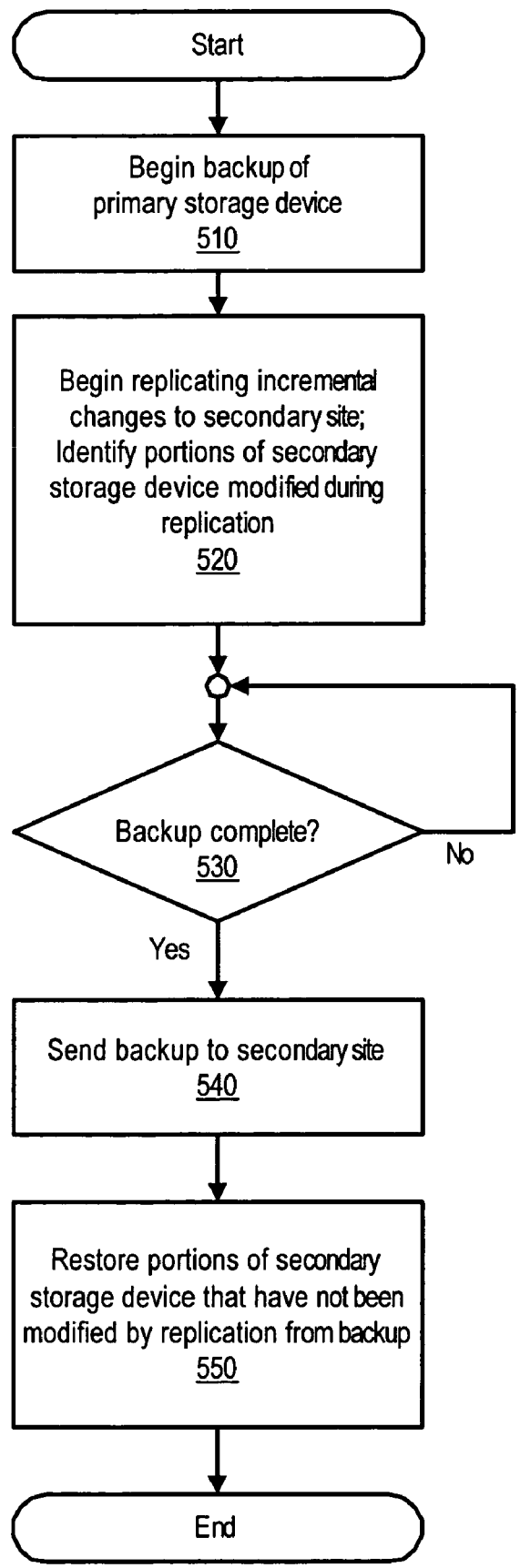
FIG. 5 is a flowchart of a method of performing replication, according to one embodiment of the present invention.

FIG. 5 is a flowchart of a method of performing replication. This method can be performed in a replication system such as the one illustrated in FIG. 4. The method begins at 510, where backup of the primary storage device is initiated. Performing the backup involves copying all of the information stored on the primary storage device to a backup storage device. The copying can be performed at the device level by copying extents or at the file level by copying files or portion of files (e.g., file blocks). When the backup is initiated, the primary site can also send information, which identifies the time at which the backup of the primary storage device begins, to the secondary site. Alternatively, a marker indicating the start of a backup can be inserted into a replication stream, allowing incremental changes being replicated to the secondary site to be identified as occurring either before or after the backup started based on whether those incremental changes are received at the secondary site before or after the marker.

At 520, incremental changes to the primary storage device are replicated to an uninitialized secondary storage device at the secondary site. The secondary storage device is uninitialized in that the secondary storage device does not store a point-in-time copy of information stored by the primary storage device. The secondary storage device is initialized by copying information from the backup (initiated at 510) to the secondary storage device.

The portions of the information stored on the secondary storage device that are affected by function 520 are identified (e.g., in a log or bitmap). For example, each time a file is transferred from the primary site to the secondary site as part of function 520, the name of the file (or other information identifying the file, such as an inode number) can be added to a log that is maintained at the secondary site. If volume-level replication is being performed, each time a block or other extent of information is copied from the primary site to the secondary site as part of function 520, a bit (or set of bits) that corresponds to that block within a bitmap can be set. If the primary site provided the secondary site with an indication of the time at which the backup was taken, the secondary site can use that time to determine which incremental changes to identify. Incremental changes that occurred prior to the time at which the backup was taken will not be identified, while incremental changes that occurred after then time at which the backup was taken will be identified.

Function 520 can be initiated before the backup, initiated at 510, has been transferred to the secondary site. Function 520 can also be initiated before the backup initiated at 510 has even been completed (i.e., before all of the data in the backup has been written to a backup device).

At 540, a determination is made as to whether the backup initiated at 510 has completed. If the backup has completed (i.e., if all of the information stored on the primary storage device has been copied to a backup storage device, creating a point-in-time copy of the primary storage device on the backup storage device), the backup is transferred to a secondary site, as indicated at 540. Additionally, information identifying the time at which the backup completed can be sent to the secondary site. For example, a marker can be inserted into the stream of incremental changes being sent to the secondary site at the time that the backup has completed.

The backup can be transferred by physically transferring the backup storage device that stores the backup from the primary site to the secondary site (e.g., via a shipping or postal service). Alternatively, the backup can be transferred to the secondary site electronically via a network.

Once the backup has reached the secondary site, the information in the backup is copied to the secondary storage device (e.g., by restoring the secondary device from the backup). However, since more recent versions of some of the information may already be stored on the secondary storage device due to the performance of function 520, selected portions of the backup may not be copied to the secondary storage device. For example, if the restoration from the backup is being performed at the file level, the restore process can access a log that lists files that have been modified when applying the incremental changes. If a particular file is listed in the log, that file will not be restored from backup. Similarly, if device-level restoration is being performed, the restore process can use a bitmap to determine whether a particular block or extent has been modified by the incremental changes. If the block or extent has already been modified, the value of that block or extent will not be copied from the backup to the secondary storage device.

It is noted that incremental changes can continue to be replicated to the secondary site while the secondary site is being restored from the backup. In one embodiment, the replication process continues to keep track of which portions of the information stored on the secondary storage device are modified due to replicated incremental changes until restoration of the secondary storage device from the backup has completed. Once the restoration of the secondary storage device from the backup has completed and the information identifying the time at which the backup completed has been received at the secondary site, the secondary storage device is considered to be in a consistent state and in sync with the primary storage device. The log or bitmap used to track changes to the secondary storage device due to replication of incremental changes can be discarded or reused for another purpose at this point.

The flowchart of FIG. 5 shows a method in which the incremental changes being replicated to the secondary site as well as the backup of the primary storage device are applied directly to the secondary storage device at the secondary site. It is noted that other embodiments can be implemented differently. For example, in one alternative embodiment, the incremental changes are applied to a snapshot or log instead of being applied directly to the secondary storage device that will be used as a replica.

Figure 6:
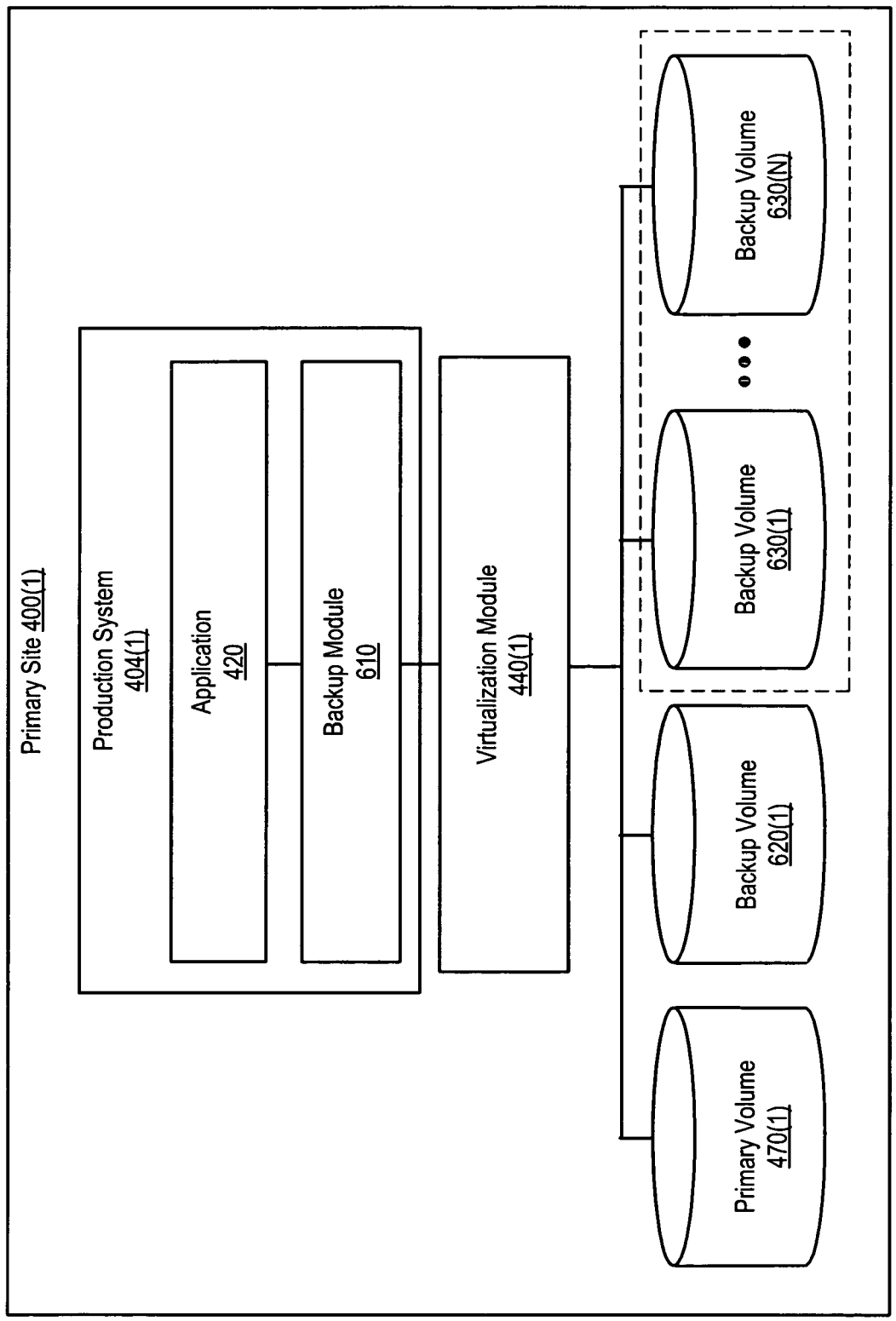
FIG. 6 is a block diagram of a system for performing backups and for restoring data from backups, according to one embodiment of the present invention.

FIG. 6 is a block diagram of a system for performing backups and for restoring data from backups. FIG. 6 includes many of the same components as the system of FIG. 4, where similar numbers identify similar components. In FIG. 6, primary site 400(1) includes production system 404(1). Production system 404(1) implements application 420 and backup module 610. In one embodiment, backup module 610 is a backup component such as VERITAS NetBackup™.

Primary site 400(1) also includes virtualization module 440(1). Virtualization module 440(1) presents several virtualized storage devices, including primary volume 470(1), backup volume 620(1), and backup volumes 630(1)-630(N).

Primary volume stores information such as application data for applications like application 420. Backup volume 620(1) stores a full backup of primary volume 470(1) that was created at T0. Thus, backup volume 620(1) provides a point-in-time copy of the information stored on primary volume 470(1) at T0.

Backup volumes 630(1)-630(N) store incremental backups of primary volume 470(1). For example, backup volume 630(1) stores an incremental backup of primary volume 470(1) that was created at time T(1), such that backup volume 630(1) stores a copy of all of the information in primary volume 470(1) that was modified between times T(0) and T(1). Similarly, backup volume 630(N) can store an incremental backup of primary volume 470(1) that was created at time T(N), such that backup volume 630(N) stores a copy of information in primary volume 470(1) that was modified between times T(N−1) and T(N).

Backup module 610 can perform backup and restore processes similar to those illustrated in FIGS. 2 and 3. Backup module 610 can create a full backup of primary volume 470(1) by creating a snapshot (e.g., using mirror breakoff or copy-on-write techniques, or by causing virtualization module 440(1) to create a snapshot using such techniques) of primary volume at the time at which the backup is desired and then writing information from the snapshot to backup volume 620(1). While the information is still being copied to backup volume 620(1), backup module 610 can begin writing to one or more of the incremental backups stored on backup volumes 630(1)-630(N).

Backup module 610 can also restore primary volume 470(1) from the full and incremental backups. When backup module 610 restores the primary volume, backup module 610 copies the incremental backups to primary volume 470(1) in reverse chronological order, such that the most recently created incremental backup is copied to primary volume 470(1) first. Backup module 610 also stores information (e.g., in a log or bitmap) that identifies which portions of primary volume 470(1) have been restored from an incremental backup. If, for example, backup volume 630(1) stores a version of a file that has already been restored from backup volume 630(N), and if the incremental backup stored by backup volume 630(N) was created more recently than the incremental backup stored by backup volume 630(1), then that version of the file will not be copied to primary volume 470(1) from backup volume 630(1). Similarly, information in the full backup stored by backup volume 620(1) will not be copied to primary volume 470(1) if that information has already been restored from one of the incremental backups.

Figure 7:
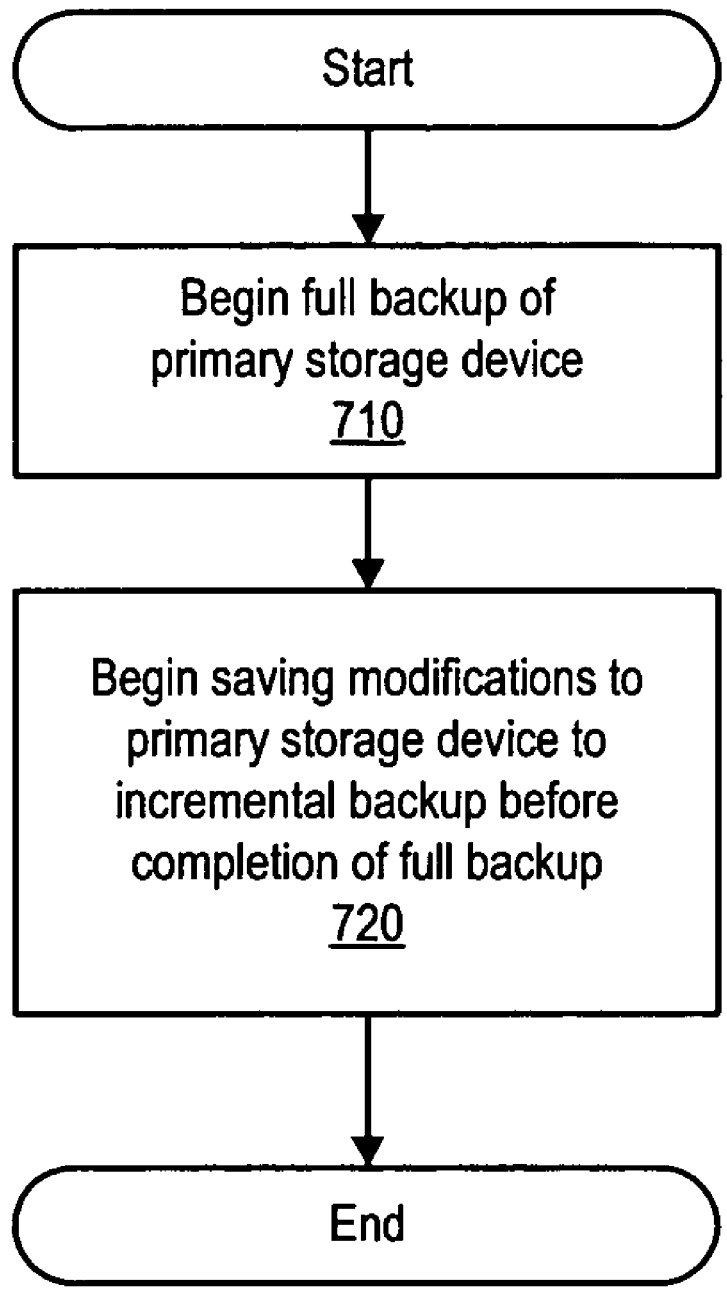
FIG. 7 is a flowchart of a method of performing backups, according to one embodiment of the present invention.

FIG. 7 is a flowchart of a method of performing backups. This method can be performed by backup module 610 of FIG. 6. The method begins at 710, when a full backup of the primary storage device is initiated. Performing the full backup involves copying information that represents a point-in-time copy of the primary storage device to a backup storage device. The information can be copied either directly from the primary storage device or from a snapshot or other point-in-time representation of the primary storage device.

At 720, modifications to the primary storage device are written to an incremental backup, before the full backup has been completed. Thus, information in the full backup is being written to one backup storage device during the same time period as information in the incremental backup is being written to another backup storage device. The incremental backup is initiated while the full backup is still being performed. It is noted that the full backup may complete before the incremental backup completes, or vice versa.

Figure 8:
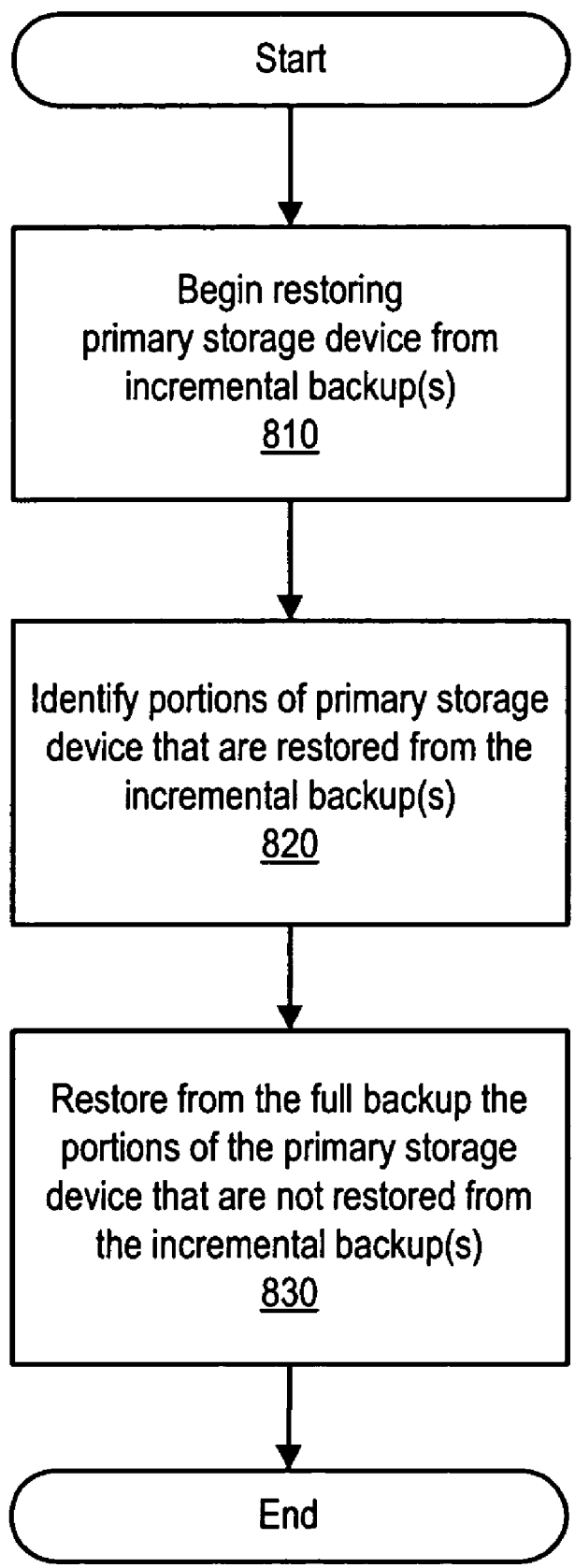
FIG. 8 is a flowchart of a method of restoring a device from backups, according to one embodiment of the present invention.

FIG. 8 is a flowchart of a method of restoring a device from backups. This method can also be performed by backup module 610 of FIG. 6. This method begins at 810, when restoration of a primary storage device from one or more incremental backups is initiated. Initiation of the restoration process causes, at least, information stored in an incremental backup to begin to be copied to the primary storage device.

At 820, the portions of the information stored by the primary storage device that are restored from the incremental backup(s) are identified. At 830, the portions of the primary storage device that are not restored from the incremental backups are restored from a full backup. In other words, information in the portions of the full backup that correspond to the non-identified portions of the primary storage device is copied from the full backup to the primary storage device.

It is noted that information from the full backup can be copied to the primary storage device during the same window of time as information is being copied to the primary storage device from one or more incremental backups. Additionally, if there are multiple incremental backups that need to be applied to the primary storage device during the restoration process, function 820 is used to prevent the information copied from a newer incremental backup from being overwritten by information in an older incremental backup.

Figure 9:
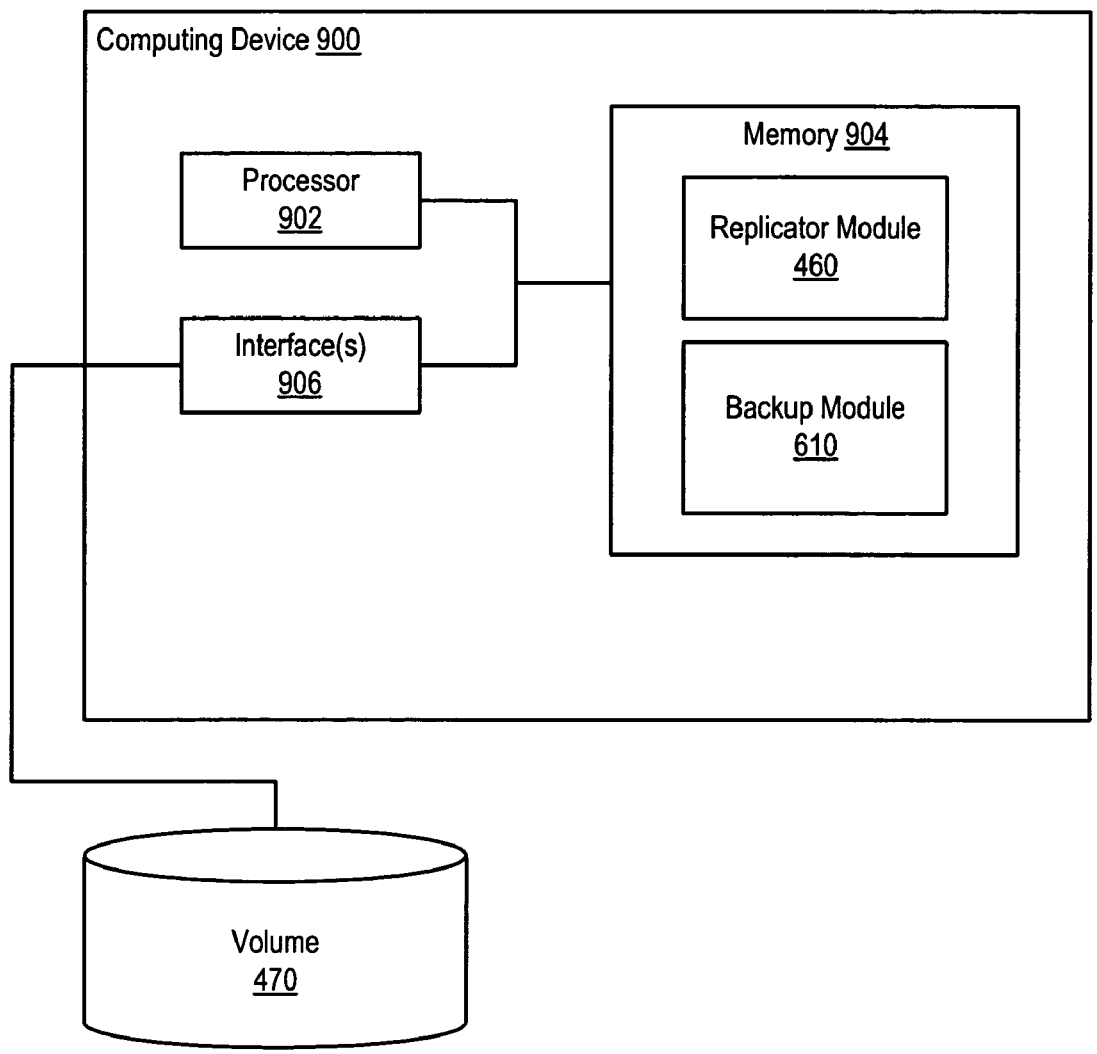
FIG. 9 is a block diagram of a computer system.

FIG. 9 is a block diagram of a computing device 900 (e.g., one of systems 404(1) and 404(2) of FIGS. 4 and 6, an array controller, a network switch, or the like). FIG. 9 illustrates how replicator module 460 (e.g., one of replicator modules 460(1) and 460(2) of FIG. 4) and/or backup module 610 (e.g., as shown in FIG. 6) can be implemented in software. As illustrated, computing device 900 includes one or more processors 902 (e.g., microprocessors, PLDs (Programmable Logic Devices), or ASICs (Application Specific Integrated Circuits)) configured to execute program instructions stored in memory 904. Memory 904 can include various types of RAM (Random Access Memory), ROM (Read Only Memory), Flash memory, MEMS (Micro Electro-Mechanical Systems) memory, and the like. Computing device 900 also includes one or more interfaces 906. Processor 902, memory 904, and interface 906 are coupled to send and receive data and control signals by a bus or other interconnect.

Interface(s) 906 can include an interface to the storage devices on which a data volume 470 (e.g., one of data volumes 470(1) and 470(2) of FIGS. 4 and 6) is implemented, as shown in FIG. 9. Such storage devices can also store data such as a log or bitmap identifying portions of data volume 470 that have been modified based on incremental changes (all or part of this information can also be stored in memory 904). Interface(s) 906 can also include an interface to a network for use in communicating with a system at another site when performing replication of data to or from that site.

The program instructions and data implementing replicator module 460 and/or backup module 610 can be stored on various computer readable storage media such as memory 904. In some embodiments, such software is stored on a computer readable storage medium such as a CD (Compact Disc), DVD (Digital Versatile Disc), hard disk, optical disk, tape device, floppy disk, and the like). In order be executed by processor 802, the instructions and data implementing replicator module 460 and/or backup module 610 are loaded into memory 906 from the other computer readable storage medium. The instructions and/or data can also be transferred to system 404 for storage in memory 906 via a network such as the Internet.

Although the present invention has been described with respect to specific embodiments thereof, various changes and modifications may be suggested to one skilled in the art. It is intended such changes and modifications fall within the scope of the appended claims.

What is claimed is:

1. A method comprising:
   identifying an incremental change to information stored on a primary device, wherein
      the incremental change is identified subsequent to a first point in time;
   applying the incremental change to a first target device, wherein
      the incremental change is applied to the first target device prior to completing initialization of a second target device,
      the initialization of the second target device initializes the second target device as a point-in-time copy of the primary device,
      the point-in-time copy of the primary device is a copy of the primary device at the first point in time, and
      the applying the incremental change to the first target device restores the first target device from an incremental backup of the primary device by virtue of the applying the incremental change to the first target device comprising
         replicating the incremental change to the first target device;
   restoring the primary device from a full backup of the primary device, wherein
      the restoring the primary device from the full backup initializes the first target device as the point-in-time copy of the primary device, and
      the first target device is a replica device; and
   restoring the second target device from a full backup of the primary device, wherein
      the restoring the second target device from a full backup of the primary device initializes the second target device as the point-in-time copy of the primary device.

2. The method of claim 1, wherein
   the second target device is a snapshot of the replica device.

3. The method of claim 1, wherein
   the first target device is the second target device.

4. The method of claim 3, wherein the restoring the second target device from a full backup of the primary comprises:
   identifying whether a unit of data stored by the replica device has been modified by the applying the incremental change to the replica device; and
   if the unit of data has not been modified, copying a value of the unit of data from the full backup of the primary device to the replica device.

5. The method of claim 4, wherein
   the unit of data comprises one of a block, an extent, a portion of a file, and a file.

6. The method of claim 4, further comprising:
   initializing the replica device at substantially the same time as applying the incremental change to the replica device.

7. The method of claim 1, further comprising:
   initializing the second target device, wherein the initializing comprises performing a full backup of the primary device to the second target device, wherein
      the first target device stores an incremental backup of the primary device,
      the second target device stores the full backup of the primary device, and
      the performing the full backup initializes the second target device as the point-in-time copy of the primary device.

8. The method of claim 7, wherein
   the initializing is performed in parallel with the applying the incremental change to the first target device.

9. The method of claim 1, wherein
   the first target device is the primary device.

10. The method of claim 9, wherein the restoring the primary device from the full backup comprises:
    identifying whether a unit of data stored by the primary device has been modified due to the applying the incremental change to the primary device; and
    if the unit of data has not been modified, copying a value of the unit of data from the full backup to the primary device.

11. The method of claim 9, wherein
    the primary device is restored from the full backup subsequent to being restored from the incremental backup.

12. A system comprising:
    a primary device;
    a first target device, wherein the primary device and the first target device are communicatively coupled to one another;
    a second target device, wherein the primary device and the second target device are communicatively coupled to one another;
    means for identifying an incremental change to information stored on the primary device, wherein
       the incremental change is identified subsequent to a first point in time;
    means for applying the incremental change to the first target device, wherein
       the means for applying the incremental change is configured to apply the incremental change to the first target device prior to completing initialization of the second target device,
       the means for applying the incremental change to the first target device is configured to restore the primary device from an incremental backup of the primary device by virtue of the means for applying the incremental change to the first target device comprising
          means for replicating the incremental change to the first target device,
       the initialization of the second target device initializes the second target device as a point-in-time copy of the primary device, and
       the point-in-time copy of the primary device is a copy of the primary device at the first point in time;
    means for restoring the primary device from a full backup of the primary device, wherein the means for restoring the primary device from the full backup is configured to initialize the first target device as the point-in-time copy of the primary device, and the first target device is a replica device; and means for restoring the second target device from a full backup of the primary device, wherein the means for restoring is configured to initialize the second target device as the point-in-time copy of the primary device, and the means for restoring comprises means for identifying whether a unit of data stored by the replica device has been modified by the applying the incremental change to the replica device, and means for copying a value of the unit of data from the full backup of the primary device to the replica device, if the unit of data has not been modified.

13. The system of claim 12, wherein the first target device is the second target device.

14. The system of claim 12, further comprising:

means for initializing the second target device, wherein the means for initializing the second target device comprises means for performing a full backup of the primary device to the second target device, wherein the first target device is configured to store an incremental backup of the primary device, the second target device is configured to store the full backup of the primary device, and the means for performing the full backup is configured to initialize the second target device as the point-in-time copy of the primary device.

15. The system of claim 12, wherein the first target device is the primary device.

16. A computer readable storage medium comprising program instructions executable to:

identify an incremental change to information stored on a primary device, wherein the incremental change is identified subsequent to a first point in time;

apply the incremental change to a first target device, wherein the incremental change is applied to a first target device prior to completing initialization of a second target device, the initialization of the second target device initializes the second target device as a point-in-time copy of the primary device, the point-in-time copy of the primary device is a copy of the primary device at the first point in time, and the applying the incremental change to the first target device restores the first target device from an incremental backup of the primary device by virtue of the applying the incremental change to the first target device comprising;

replicating the incremental change to the first target device, restore the primary device from a full backup of the primary device, wherein the restoration of the primary device from the full backup initializes the first target device as the point-in-time copy of the primary device, and the first target device is a replica device; and restore the second target device from a full backup of the primary device, wherein the restoration of the second target device from the full backup initializes the second target device as the point-in-time copy of the primary device, the restoration of the second target device from the full backup comprises identifying whether a unit of data stored by the replica device has been modified by the applying the incremental change to the replica device, and if the unit of data has not been modified, copying a value of the unit of data from the full backup of the primary device to the replica device.

17. The computer readable storage medium of claim 16, wherein the first target device is the second target device.

18. The computer readable storage medium of claim 16, wherein the program instructions are further executable to:

initialize the second target device, wherein initializing the second target device comprises performing a full backup of the primary device to the second target device, the first target device stores an incremental backup of the primary device, the second target device stores the full backup of the primary device, and performing the full backup initializes the second target device as the point-in-time copy of the primary device.

19. The computer readable storage medium of claim 16, wherein the first target device is the primary device.

20. A system comprising:

a processor; and a memory communicatively coupled to the processor, wherein the memory stores program instructions executable to:

identify an incremental change to information stored on a primary device, wherein the incremental change is identified subsequent to a first point in time;

apply the incremental change to a first target device, wherein the incremental change is applied to a first target device prior to completing initialization of a second target device, the initialization of the second target device initializes the second target device as a point-in-time copy of the primary device, the point-in-time copy of the primary device is a copy of the primary device at the first point in time, the applying the incremental change to the first target device restores the first target device from an incremental backup of the primary device, and the applying the incremental change to the first target device restores the first target device from an incremental backup of the primary device by virtue of the applying the incremental change to the first target device comprising replicating the incremental change to the first target device;

restore the primary device from a full backup of the primary device, wherein the restoration of the primary device from the full backup initializes the first target device as the point-in-time copy of the primary device, and the first target device is a replica device; and restore the primary device from a full backup of the primary device, wherein the restoring the primary device from the full backup initializes the first target device as the point-in-time copy of the primary device.

* * * * *